United States Patent
Jain

(10) Patent No.: US 10,073,971 B2
(45) Date of Patent: Sep. 11, 2018

(54) TRAFFIC PROCESSING FOR NETWORK PERFORMANCE AND SECURITY

(71) Applicant: Microsoft Technology Licensing, LLC, Redmond, WA (US)

(72) Inventor: Navendu Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 13/931,742

(22) Filed: Jun. 28, 2013

(65) Prior Publication Data

US 2015/0007317 A1 Jan. 1, 2015

(51) Int. Cl.
| | | |
|---|---|---|
| *G06F 21/56* | (2013.01) | |
| *G06F 21/53* | (2013.01) | |
| *H04L 29/06* | (2006.01) | |

(52) U.S. Cl.
CPC ............ *G06F 21/56* (2013.01); *G06F 21/53* (2013.01); *H04L 63/0227* (2013.01); *H04L 63/1416* (2013.01); *H04L 63/1458* (2013.01)

(58) Field of Classification Search
CPC ............ H04L 63/0263; H04L 63/0281; H04L 63/0227; H04L 63/1416; G06F 21/10; G06F 21/56; G06F 21/53
USPC ........................................ 726/11–13, 23–30
See application file for complete search history.

(56) References Cited

U.S. PATENT DOCUMENTS

| | | | | |
|---|---|---|---|---|
| 8,295,300 | B1* | 10/2012 | Chartier ............... | H04L 49/201 370/432 |
| 2002/0129159 | A1* | 9/2002 | Luby et al. ................... | 709/236 |
| 2004/0001473 | A1* | 1/2004 | Liu ..................... | H04L 12/4633 370/349 |
| 2004/0199660 | A1* | 10/2004 | Liu ......................... | H04L 69/04 709/236 |
| 2006/0288418 | A1* | 12/2006 | Yang ..................... | H04L 63/145 726/24 |
| 2009/0241190 | A1* | 9/2009 | Todd ....................... | G06F 21/53 726/23 |
| 2010/0274844 | A1* | 10/2010 | Lindgren et al. ............. | 709/203 |
| 2011/0176556 | A1* | 7/2011 | Guo ...................... | H04L 1/0041 370/474 |
| 2012/0191768 | A1* | 7/2012 | Hickey ................ | G06F 9/5027 709/201 |
| 2012/0216273 | A1* | 8/2012 | Rolette ................. | G06F 21/577 726/13 |

(Continued)

*Primary Examiner* — Hadi S Armouche
*Assistant Examiner* — Shaqueal D Wade

(57) ABSTRACT

Aspects of the subject disclosure are directed towards protecting machines, such as virtual machines in a cloud datacenter, from receiving unwanted traffic, and also reducing bandwidth by eliminating redundant data transmissions. In one aspect, an agent intercepts packets from a source, and determines whether the destination is allowed to receive packets from the source, based upon a communication group membership. The agent also may drop packets based upon malware/fraud signatures. The agent also attempts to reduce bandwidth by replacing redundant content with identifiers (e.g., hashcodes), which a destination machine uses to rebuild the original content. A destination-side agent may perform the same or similar communication group membership and malware/fraud signature filtering operations, and reassemble redundancy-reduced content from received identifiers as needed.

25 Claims, 11 Drawing Sheets

(56) References Cited

U.S. PATENT DOCUMENTS

2012/0317655 A1* 12/2012 Zhang et al. .................. 726/28
2014/0068749 A1* 3/2014 Fang ................... H04L 63/0227
                                                                    726/12

\* cited by examiner

US 10,073,971 B2

TRAFFIC PROCESSING FOR NETWORK PERFORMANCE AND SECURITY

BACKGROUND

Contemporary networks such as in enterprises or in cloud computing platforms are challenged by chatty applications (tenants) and/or bandwidth-intensive applications (e.g., multimedia and file sharing applications, background replication, social media applications, email, and N to M traffic patterns in map-reduce jobs where multiple senders send data simultaneously to different receivers). For example, the hosted tenants can consume a significant part of network resources and bandwidth.

Moreover, hosted third-party applications in a network can inadvertently interfere with each other or maliciously attack other applications. For example, in an environment with multiple virtual machines, an application may launch a distributed denial of service (DDoS) attack by sending significant amounts of traffic to other virtual machines, such as those hosting applications of competitors. Whether because of a bug or a targeted attack, this can degrade the performance of the shared network resulting in 'collateral damage' in performance, availability, or security to other hosted tenants, bring down the other virtual machines, or both.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards processing data from a source intended for a destination, including determining whether a communication group allows the data to be communicated to a destination for receipt by a destination program, and if not, dropping the data. The processing may occur at the source, between the source and the destination, and/or at the destination.

One or more aspects are directed towards a processing agent that enforces policy on data to be sent from a data source to a destination. The processing agent communicates with a lookup service or cache to obtain information as to whether data traffic of a data source is allowed to be sent to a destination and/or received by a destination program. If so, the processing agent may reduce redundant traffic by using an identifier representative of content instead of the content for at least some of the data.

One or more aspects are directed towards intercepting data from a data source that is intended for a destination. A determination is made as to whether the communication may be sent, including accessing information that indicates that the source is allowed to send to the destination via communication group membership, and information that indicates that the data does not contain a known malware and/or fraud signature. Upon determining that the data is allowed to be sent to the destination, at least part of a data payload is replaced with an identifier for each replaced part to provide a reduced-size data transmission structure (e.g., packet). The reduced-size data transmission structure is sent to the destination.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
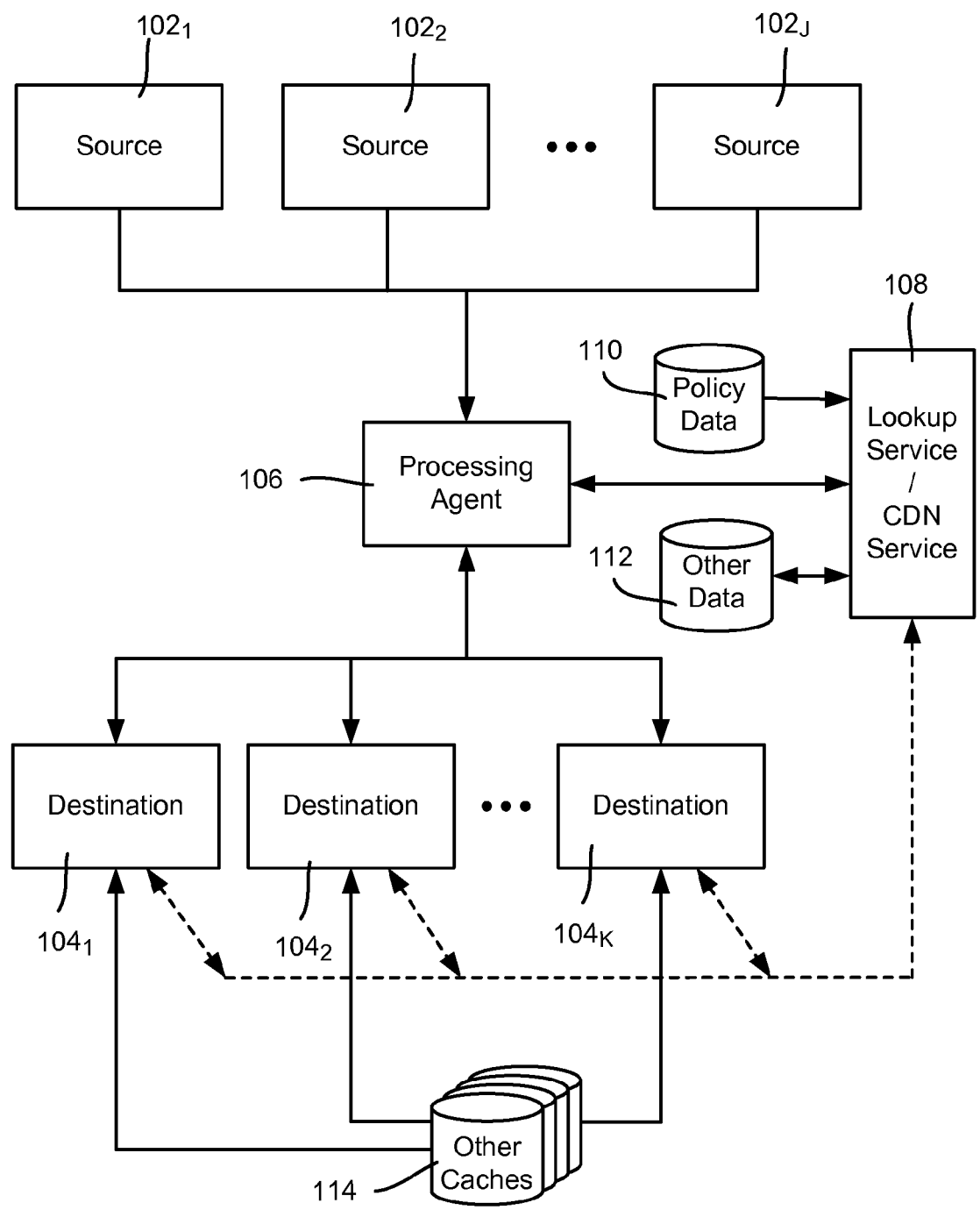
FIG. 1 is a block diagram representing example components for enforcing transmission policy and/or reducing the transmission of redundant data in a datacenter or between datacenters, according to one example implementation.

Various aspects of the technology described herein are generally directed towards isolating applications from one another, including applications in a datacenter, and/or reducing bandwidth costs. To this end, a traffic analyzer (referred to herein as a processing agent) enforces isolation policy, and for data transmissions that are allowed to be sent, attempts to reduce (which includes possibly fully eliminating) the transmission of redundant data. Isolation policy may be similarly enforced at a destination, e.g., before allowing traffic to reach an application. As will be understood, the technology thus protects networks from inadvertent or malicious attacks, including from the inside by other running tenants, and reduces bandwidth costs. In one or more implementations, the processing agent also detects and prevents the sending of malware and/or fraudulent traffic, thereby detecting and dropping potentially malicious traffic at the source before it enters the network and/or at a destination before reaching a program (e.g., an application).

In one aspect, a service communication group (CG) of mutually trusted virtual machines is provided and maintained. For example, a tenant/owner of virtual machines may specify policy data as to which virtual machines/applications are allowed to communicate with one another. The processing agent checks each data packet or other structure sent from a source to a destination against the communication group information to determine whether the transmission is allowable. A lookup service may maintain the communication group membership.

In one aspect, an end-host based technology eliminates/reduces redundancy in intra-datacenter and inter-datacenter network traffic to reduce bandwidth costs. A content distribution network (CDN) service may track network-wide redundant content (and also maintain a list of malware signatures). For example, packet headers may be modified to carry an identifier of an entire set of redundant content and its checksum; the destination locates a cached copy of the packet and obtains the original packet from the cache, or connects to a nearby node (e.g., based upon network proximity such as same rack as that of the destination) of the CDN service which contains the redundant content.

As another example, packet content (payload) may be broken into one or more sets of redundant content (referred to as chunks) and/or original data, with data that identifies each chunk and that chunk's byte boundaries (offset and size) in the payload transmitted instead of the data content. The destination locates the actual content via the identifier (e.g., in a cache), and assembles the original content.

It should be understood that any of the examples herein are non-limiting. For example, virtual machines are exemplified in one or more implementations as being the sources of data transmissions to destinations, however the technology described herein is not limited to virtual machine environments. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

FIG. 1 shows a generalized block diagram in which a plurality of sources $102_1$-$102_J$ (e.g., virtual machines) are coupled to a plurality of destination machines $104_1$-$104_K$, some or all of which may be virtual machines. Some or all of the destination machines $104_1$-$104_K$ may be in the same datacenter with the sources, or some or all of the destination machines $104_1$-$104_K$ may be in remote locations, e.g., in one or more other datacenters.

Figure 2:
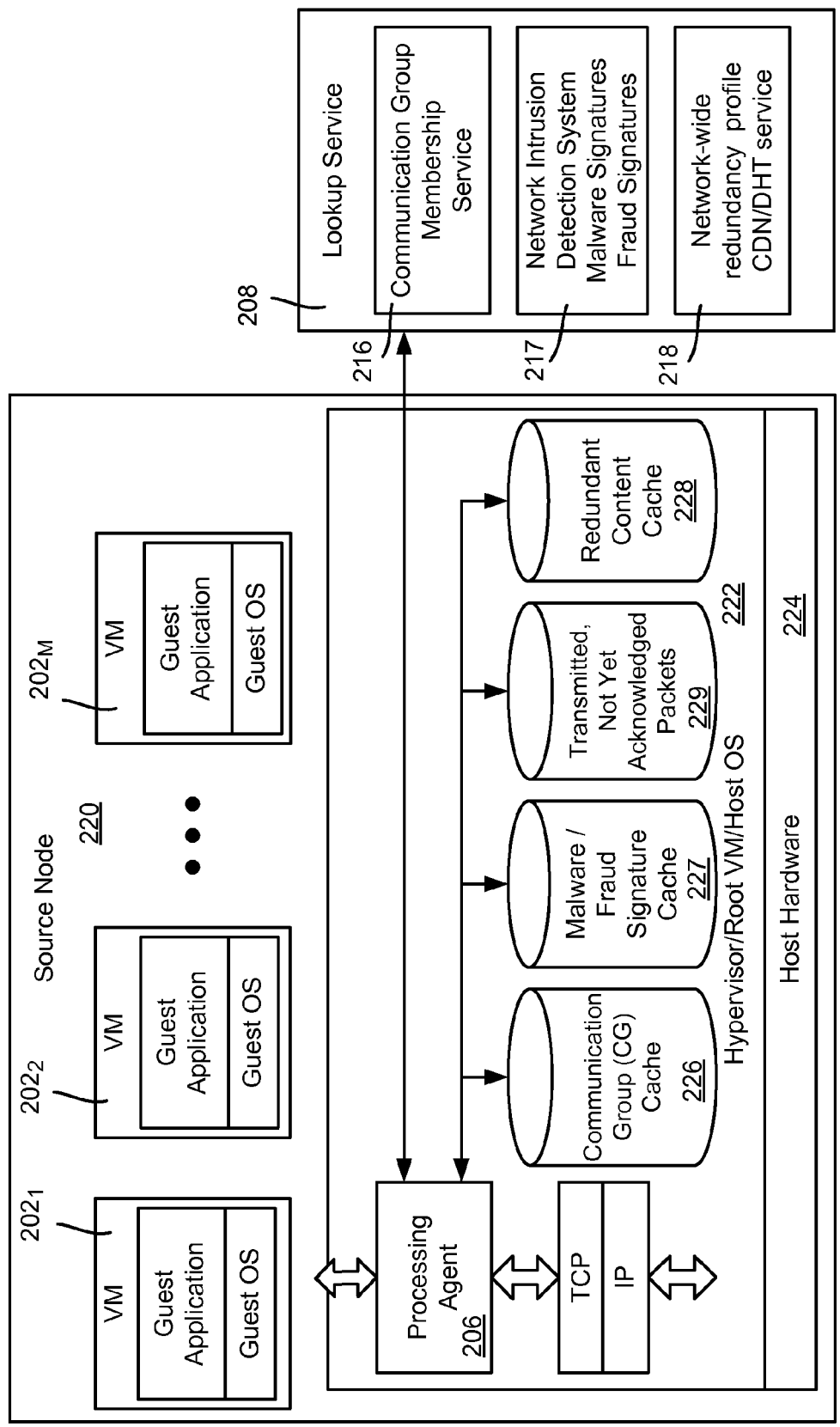
FIG. 2 is a representation of a processing agent in a source server node comprising a plurality of virtual machines, the processing agent enforcing transmission policy and/or reducing the transmission of redundant data, based upon information from a network service, according to one example implementation.

As described herein, each of the sources $102_1$-$102_J$ are coupled to a processing agent 106 that enforces policy, including whether a given source is allowed to transmit data to a given destination. As can be readily appreciated, there may be multiple instances of a processing agent 106, each coupled to a subset of the available sources, and part of the processing agent's operations is to perform filtering. However, as shown in the example of FIG. 2, in which the sources comprise a plurality of virtual machines $202_1$-$202_J$ on a server node 220, a processing agent 206 may be part of or closely coupled to the Hypervisor/Root VM/Host OS 222 that manages the virtual machines above the host hardware 224. For example, source-based processing (e.g., the agent) may be implemented as a shim layer in the hypervisor or root virtual machine, so as to intercept network communications, processes the data and optionally modify packet headers and content.

To detect malware, a cache (e.g., 227) of malware and/or fraud signatures can be kept at each host, against which the content of each outgoing packet can be evaluated. Along with malware, 'fraud' traffic can be dropped, e.g., if a fraudster is using stolen credit cards to open a large number of subscriptions or doing transactions. Detecting whether a packet or a series of packets corresponds to 'fraud' traffic may be accomplished via signatures (like malware). Note that if fraud detection needs to look at a sequence of packets before classifying the traffic, the first packet or intermediate packets may be buffered at the source until a fingerprint signature gets matched. After that, the entire sequence of potential 'fraud traffic' packets can be dropped if matched, or sent to the destination if not fraudulent.

As shown in FIG. 1, the processing agent 106 communicates with a lookup service/content distribution network (CDN) service 108, which accesses the policy data 110 and other data 112, such as data related to reducing redundant transmissions and/or a list of malware signatures. Although shown in FIG. 1 as being combined in block 108, it is understood that the lookup service and content distribution network (CDN) services may be distinct services, e.g., possibly running on different machines (or sets of machines) in the datacenter/network.

Turning to the example implementation of FIG. 2, for each outgoing connection, a processing agent 206 checks that the destination corresponding to that connection is part of a communication group of the sender source, a virtual machine such as $220_2$ in this example implementation. To this end, the processing agent 206 first checks a local cache 226 (e.g., in the server node 220). If not determined from the cache lookup, the processing agent 206 queries a membership lookup service 210 (e.g., a directory service of the lookup service 208) to check if one or more new sources (virtual machines) allowed for this destination may have been added since the last cache update. Note that as shown in the example of FIG. 2, the cached copy is kept locally to improve performance, and can be periodically (or otherwise, such as whenever a change occurs) synchronized with the lookup service 208. Depending on the frequency of synchronization, it is possible for a formerly allowed, but now-disallowed source to send to a destination, but this staleness window can be kept brief; indeed, disallowances or invalidations can be propagated more rapidly than new allowances (because of the secondary check for updates in the lookup service 208 when allowance is not found in the local cache 226).

Note that the source filtering of traffic for communication group membership may be only performed for new connection attempts, e.g., TCP SYN, for performance reasons. For example, once a connection is established and tracked in a flow table at the source, only malware/fraud traffic checking and redundancy elimination/reduction need to be done, as described below.

Additionally, as generally represented in FIG. 1, a destination or intended recipient can also perform checking for disallowances on receiving a packet from a source. More particularly, a receiver/destination may be coupled to the processing agent 106 (or another instance thereof) to perform checking of malware signature and communication group membership lookup. In this way, if a sender is compromised, or other traffic is received (e.g., coming from the Internet, which is not originating on the cloud provider's servers), the traffic may be filtered. For traffic originating outside of the network in which the destination is located, elimination or reduction of redundant traffic may not be applicable because the source is not connected or authorized to use the CDN service in the destination's network.

Figure 3:
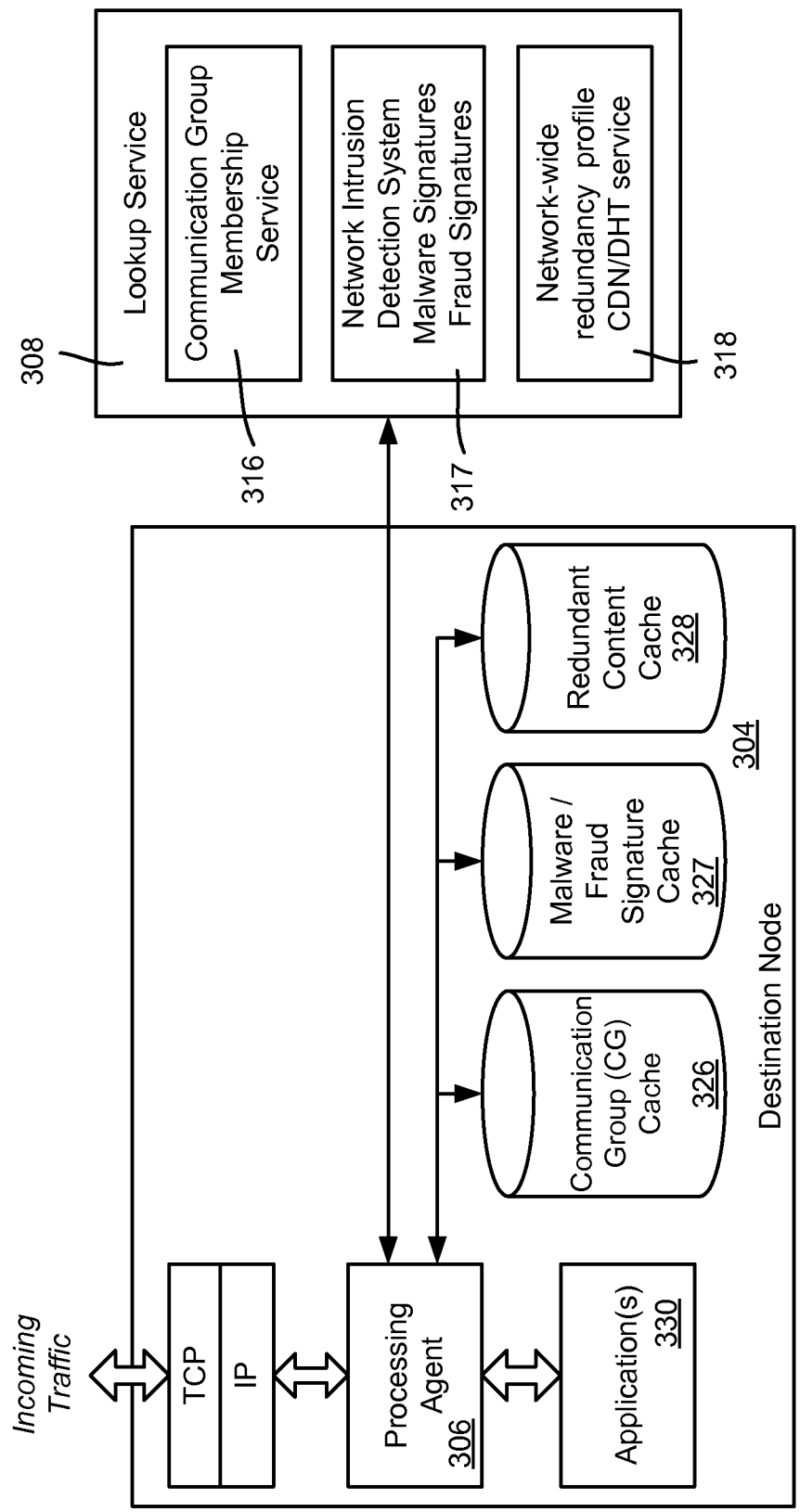
FIG. 3 is a representation of a processing agent in a destination node configured to enforce transmission policy and/or reassemble chunked data, based upon information from a network service, according to one example implementation.

FIG. 3 shows this in more detail, in which for incoming traffic to a destination node 304, a processing agent 306 checks that the sender of the traffic is part of a communication group of the destination. To this end, the processing agent 306 first checks a local cache 326. If not determined from the cache lookup, the processing agent 306 queries a membership lookup service 310 (e.g., a directory service of the lookup service 308, which may be the same as in FIG. 2) to check if allowed. Note that as shown in the example of FIG. 3, the cached copy is kept locally to improve performance, and can be periodically (or otherwise, such as whenever a change occurs) synchronized with the lookup service 308.

If a destination is allowed to receive a communication based upon the communication group, further filtering including malware/fraud signature checking may be performed, e.g., via a cache 327 or via the service (block) 317. Also described herein is reassembling content (via blocks 318 and 328) that was not communicated as part of redundancy reduction. After processing by the processing agent 306, a packet is either discarded or reaches the intended application (of a set of one or more applications 330).

Note that with respect to a sender or a destination, a communication group may explicitly allow communication with a node and/or explicitly disallow a communication. For nodes not explicitly identified, the communication group model may be inclusive (e.g., include only nodes identified and disallow traffic to or from all others) or exclusive (e.g., exclude only nodes identified and allow traffic to or from all others).

Another alternative in determining whether to allow/not allow a communication may be based upon the 'type of data' being sent from a source to a destination, and/or the communication protocol over which the data is being sent. For instance, a destination only may accept data being sent over TCP connections, but not over UDP from a specific source. As another example, only certain types of requests may be allowed from a source to a destination, while other request types are denied. Type-based/communication protocol-based determination may be implemented via a 'Payload type' field in the packet.

A service may have multiple communication groups, and each communication group may be defined as a communication group of virtual machines, servers, or other services (e.g., specified as a virtual IP address (VIP)) within that service that are allowed to communicate with each other in the datacenter network. For example, all virtual machines belonging to the same owner (i.e., a single tenant) may form a communication group. The cloud-hosted tenant may provide a list of virtual machines in its service communication group at the time of deployment; by default, all virtual machines of a service can be automatically added to the tenant's communication group, for example. Further, virtual machines of external services such as DHCP, storage system, and user authentication, can also be part of a service's communication group.

A communication group may contain as few as one pair of trusted virtual machines/services that are allowed to communicate with each other, providing a concept of trusted pairs. The pairing may be a set of virtual machines paired with a set of trusted services.

Although communication groups apply to virtual machines and/or virtual machine applications, communication groups may apply to other sources and destinations. For example, communication groups may comprise storage/compute nodes of an application/service, nodes across different applications/services that are allowed to communicate with one another, and so forth.

Note that it is also feasible to have more refined communication groups, such as based upon direction of communication. For example, a source A may be allowed to transmit to B, but not to receive data from B (although acknowledgement packets may be allowed to be returned, for example). Thus, instead of allowing bidirectional communication in a given communication group, a destination may have one or more allowed sources associated therewith, but those sources (when the sources act as destinations) do not necessarily have bidirectional communication allowed with the same set of destinations (when the destinations act as sources).

Each source may have a communication group or set of groups that allow communication to only certain destinations, and each destination may have a communication group or set of groups that allow communication from only certain sources. Thus, both source and destination may need to allow a communication before a destination application ultimately receives a packet from a source.

Further, any other policy/criteria may be enforced by the processing agent (at the source and/or the destination), e.g., source A may be allowed to transmit data to destination B only between 10 pm and 4 am the next day. As other policy-based criteria, a destination may have a data size quota for receiving data from a source, which the processing agent tracks and enforces so that the quota cannot be exceeded. The processing agent may be configured to charge a fee for data leaving the datacenter to a remote destination, and so on. More broadly, similar to Firewall rules, other criteria could be that the sender can only send traffic via a specified protocol and a specific port to the destination.

In another aspect, if the source (e.g., virtual machine) is verified as part of the destination machine's communication group, a flow entry is set up in a local table. Then, deep packet modification may be performed to eliminate redundancy based on exchanged traffic between the source-destination pair. Information on the redundancy may be kept in network-wide redundancy profile data 218 (FIG. 2), at least some of which may be maintained in a local cache 228 of the server node 220. Note that in addition to reducing redundancy, (e.g., before attempting to reduce redundancy), deep packet inspection may be performed on the packet or across multiple packets to detect any malware, e.g., worm signatures; information on the malware may be kept in network intrusion detection system malware signature data 217, at least some of which may be maintained in a local cache 227 of the server node 220. Fraud signatures may be similarly kept as part of the signature data.

Deep packet modification is based upon the observation that many packets or other structures (e.g., the payload within a packet) are repeatedly transmitted from sources to destinations. A general goal of deep packet modification is to replace original content with encodings of any redundant parts, along with any remaining content so that the original content can be reconstructed at the destination. The processing agent 206 is configured to perform such deep packet modification, and may maintain the redundant content cache 228 or the like to perform this efficiently.

In one aspect, an entire packet may be converted/modified to a packet that contains a packet identifier (e.g., a GUID) of an already-sent packet (and possibly a checksum). When received at a destination, the destination knows that the modified packet is referencing an already-transmitted packet via its identifier. The destination seeks to replace this packet (generally the entire payload thereof) with data of the original packet, e.g., by looking for the packet in a local cache, or querying the content distribution network for the location of a cache (e.g., in one or more the other caches 114 of FIG. 1) that contains the packet data. Note that the other cache may be selected by closeness, e.g., the destination will look to the closest cache (e.g., in the same server rack) to obtain the data as efficiently as possible.

As another example, in one embodiment, one or more parts of the payload may contain redundant data. Each redundant part (referred to as a "chunk") is encoded with an identifier which is used as a pointer to the data instead of sending the data. For example, after the normal MAC/IP/TCP protocol headers 440 (FIG. 4), the packet containing the encodings includes a redundancy elimination protocol header 442 comprising a GUID field 443, a number of chunks field 444, compression information 445, and a payload checksum 446. Note that one or more embodiments thus preserve the protocol fields and headers (e.g., IP, TCP), whereby deep packet modification requires no change at the network's routers. Note that the compression information 445 may be for the entire payload, and may be a yes/no flag, or contain more data, such as a byte that indicates whether the payload is compressed and if so what compression scheme was used.

Figure 4:
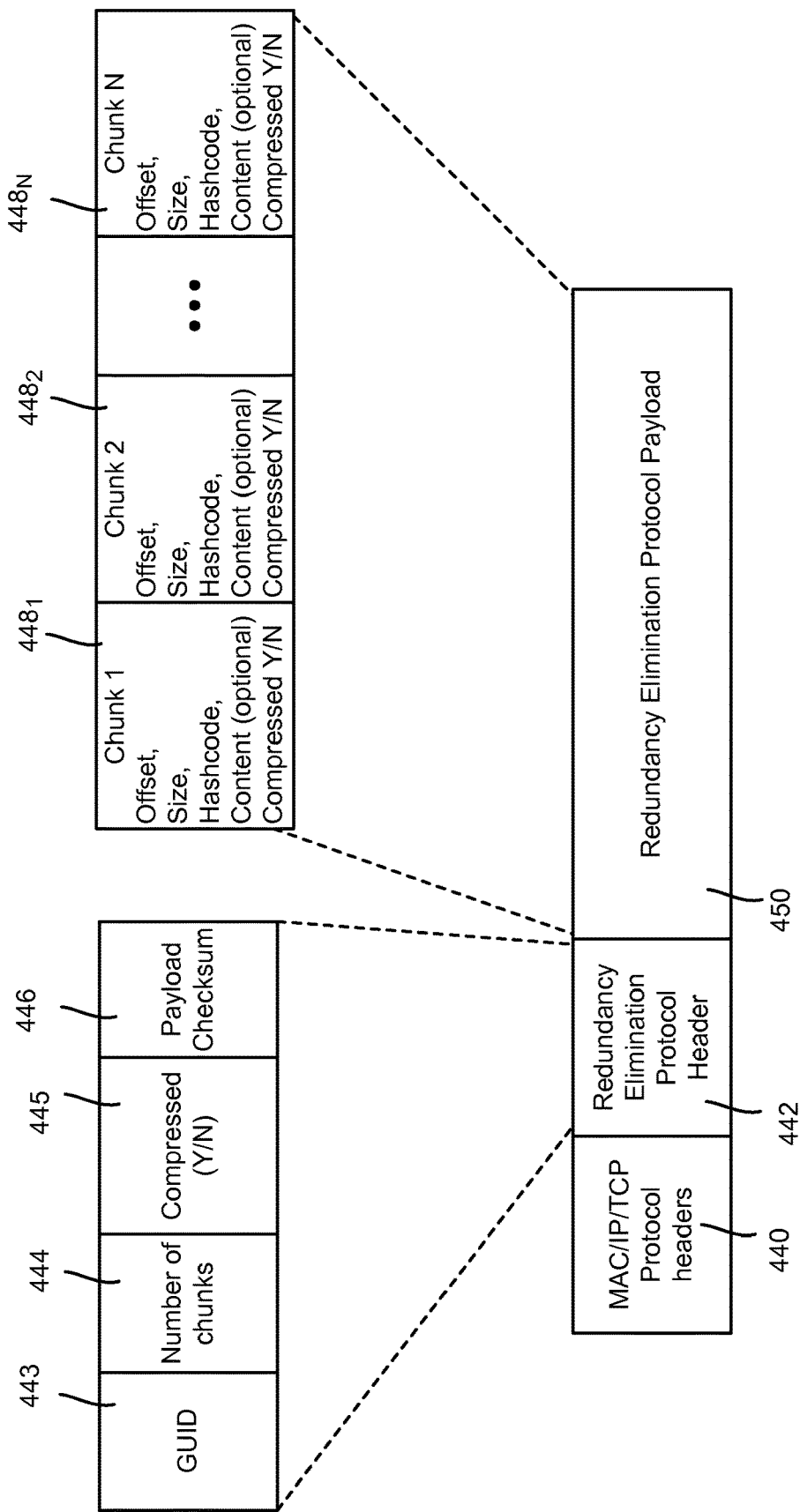
FIG. 4 is a representation of how chunks of redundant data may be reduced via identifiers and related data in a data structure, according to one example implementation.

To facilitate reassembly of the original data from chunks, the representative chunk data $448_1$-$448_N$ may specify the chunk's boundary (offset from the start and chunk size), an encoding identifier e.g., hash of the content (e.g., MD5, SHA-1) and a checksum (e.g., CRC). Compression information may be maintained per chunk, e.g., whether each individual chunk needs to be decompressed (and possibly the compression scheme used). This is shown in FIG. 4 for a number of chunks that comprise all or part of a redundancy elimination protocol payload 450. Note that non-chunked content may be contained in the payload as well, and such content may be optionally compressed e.g., using LZW or gzip compression algorithms.

Figure 5:
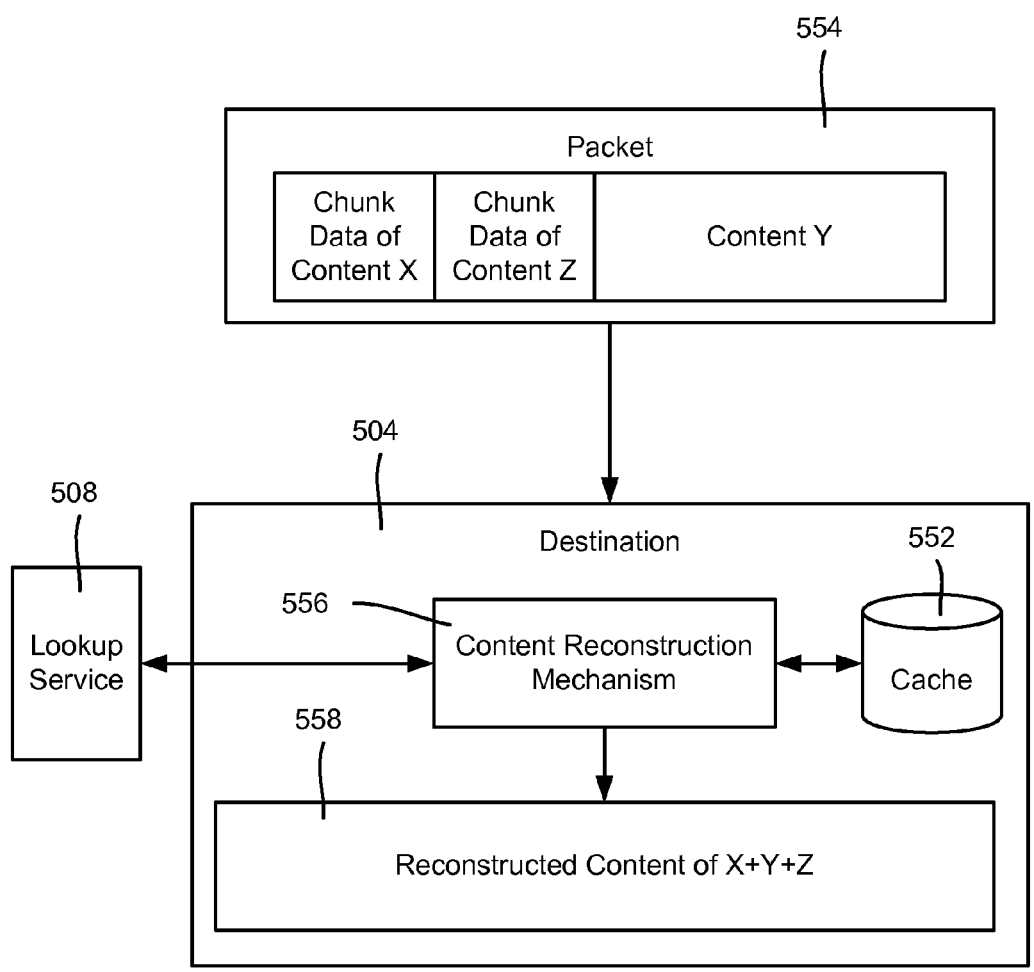
FIG. 5 is a representation of a destination machine reconstructing content from chunk identifiers, according to one example implementation.

On receiving the reduced-payload packet, the destination determines whether the packet (at least its payload) may be replaced as a whole, or whether the packet payload is chunked into one or more chunks, possibly mixed with non-chunked content. Decompression is performed as needed. As generally represented in FIG. 5, the destination 504 first looks up the encoded content in its local packet/chunk cache 552 (and if needed the lookup service 508) to reconstruct the original packet. For example, in FIG. 5, consider that that packet 554 has two chunks, corresponding to content X and Z, and other, non-chunked content Y. A content reconstruction mechanism 556 in the destination uses the size and offset data associated with each chunk to reassemble the content to its original form 558, e.g., X, Y and Z in this example.

Because in one or more implementations the offset information is present in the chunks (and/or any non-chunked content), the chunks and/or any non-chunked content may be interleaved in any manner. For example, it may be more efficient to keep chunks together for batch processing/lookup, and so forth. Alternatively, a straightforward scheme is to keep the chunks and non-chunked content in the original offset order.

Note that the destination 504 can ask the sender to resend the entire packet or a subset of the content on demand e.g., when any packet caches purged the entry earlier, data corruption is detected, and so forth. Further note that the source agent may be configured to automatically (or be instructed in the request to) not attempt reduction for a given retransmission request, e.g., so that an original packet may be generated and received in case of data corruption or the like of cached data. FIG. 2 shows the source maintaining a cache 229 of transmitted but not yet acknowledged packets for this purpose. The packets are maintained in their original form, or compressed form when appropriate; (note that compressed does not mean reduced via chunking).

If not locally cached, the destination machine 504 may communicate with the lookup service/CDN service 508 to obtain content represented by an identifier (e.g., hashcode). More particularly, to reduce bandwidth further, a logically centralized lookup service 508 can store redundant traffic data patterns observed across communicating pairs. To this end, a source virtual machine sends a GUID (e.g., hashcode) of the redundant data to the destination, which (if it is not cached at the destination) then queries the lookup service 508 to send the data, or provide a reference to a server that has the data cached. Thus, in a worst case scenario, the traffic is only carried over half the network distance between the source and destination on average; in a "best" case the data can be delivered through an intra-rack neighboring node of the lookup service or the destination 504, for example.

The lookup service 508 can comprise a datacenter network-wide content distribution network (CDN) service that trades storage for bandwidth savings by keeping multiple copies of redundant data spread throughout the network. The content distribution network also may try to locate copies of redundant data in proximity of locations where they are needed. A distributed hash table (DHT) service (e.g., in block 218 of FIG. 2) maps a key to the node identifiers hosting the content. In this way, for example, a destination (or part of the service) may receive a plurality of node identifiers that each contain the desired content, and select the node that (likely) will provide the content most efficiently.

Caching to reduce redundancy may be further extended in the network. For example, end-host based redundancy reduction/elimination can be combined with packet caches at routers, where routers may selectively cache some of the packets flowing through them, marking them (e.g., through protocol fields in packet headers) so that downstream routers (hinting but not binding) can also cache them. Upon seeing a redundant packet that was previously cached, the router may modify the packet to only send its encoding to the downstream router, and so on, similar to the communication between source and destination end-hosts.

An advantage of these mechanisms is that they save network bandwidth costs, and prevent potentially malicious traffic from leaving the source, thereby saving network resources and avoiding link saturation and switch-buffer congestion, as well as computational resources at the destination.

Figure 6:
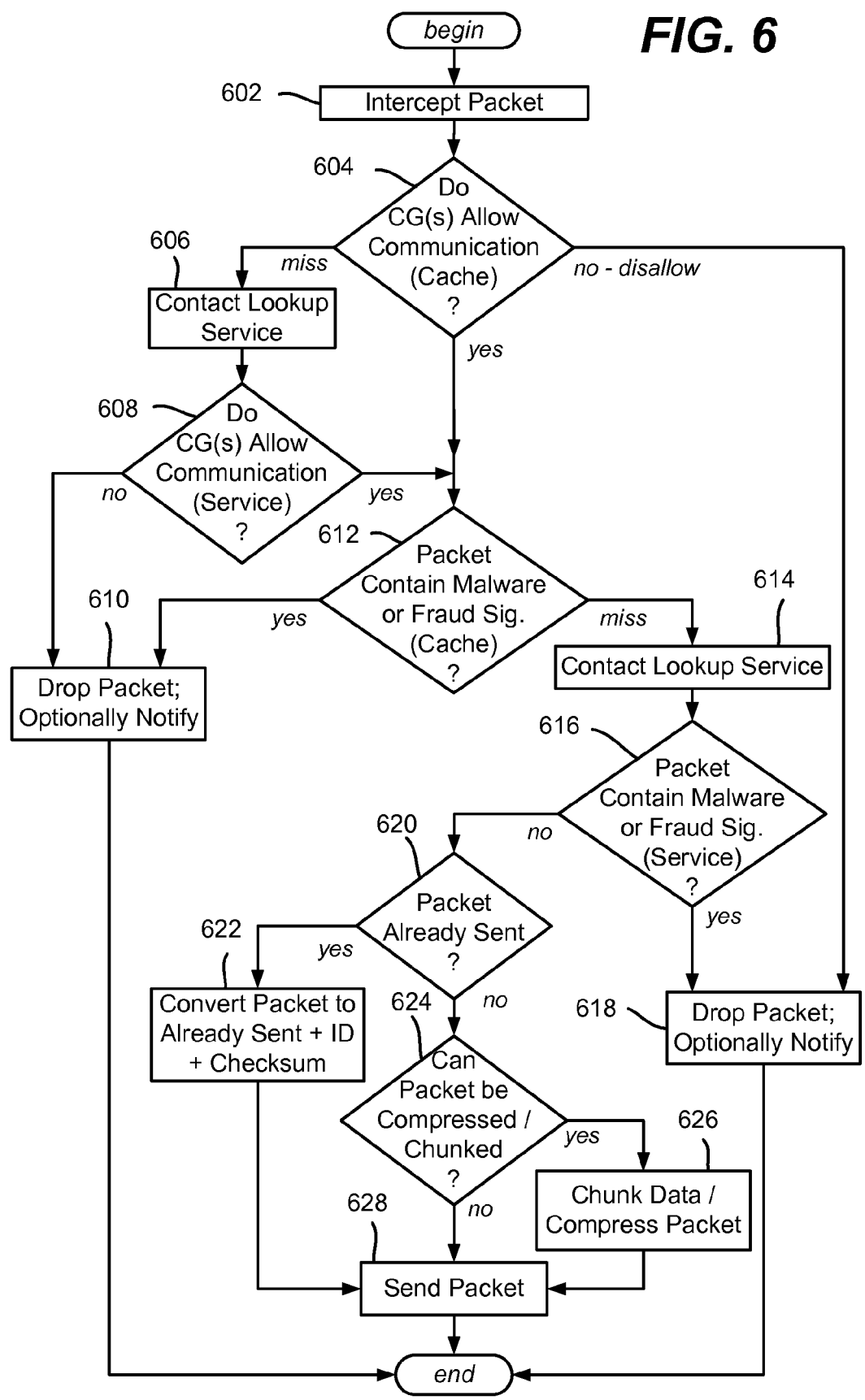
FIG. 6 is a flow diagram representing example steps that may be taken to drop malicious traffic and reduce redundant traffic before going into the network, according to one example implementation.

FIG. 6 summarizes example steps that may be taken to process a packet at the source end-host before the packet enters the network, including to stop potentially malicious traffic, and if not deemed malicious, to attempt to reduce (and possibly eliminate) redundant traffic. Step 602 represents intercepting a packet.

Step 604 evaluates the communication group (CG) to determine whether the communication is allowed, according to the local cache. There are three possible outcomes. One is that the communication to the destination is explicitly allowed, in which event step 604 branches to step 610. Another is that the communication is explicitly disallowed, in which event step 604 branches to step 618 where the packet is dropped and an optional notification is output. A third possibility is that a cache miss occurred, in which event step 604 branches to step 606.

Step 606 contacts the lookup service in case there has been a communication group update since the cache was last synchronized. If also not allowed in the communication group according to the lookup service, then the packet is dropped at step 612, optionally with a return code/notification indicating destination not reachable or the like. The entry may be synchronized in the cache whenever the lookup service is contacted.

Note that various ways to deal with stale cache data may be employed. For example, each cache entry may have a timestamp as to when that entry expires. Further, step 604 may suspect based upon a number of retries, an older entry and/or the like that a cache entry may be outdated. In such an event, the cache data may be ignored and treated as if a cache miss occurred, which also may cause synchronization of that entry. Still further, certain actions at the lookup service, such as each addition or deletion of a communication group entry may result in on-demand synchronization.

If the sender and destination are allowed to communicate, step 610 checks the packet content against a malware signature and/or fraud signature cache. In matched, the packet is dropped at step 612 with an optional notification/return code indicating the malicious content of the dropped packet.

Otherwise a cache miss occurred, and the process continues to step 614. Step 614 contacts the lookup service which looks in its malware signature and/or fraud signature data store for the signature. If the packet has a detected signature, step 616 branches to step 618 to drop the packet and (optionally) send a notification. Note that when a cache miss occurs and the signature is detected, the cache may be updated with the signature.

Step 620 evaluates whether the packet has already been sent, e.g., the content as a whole as identified by a common packet identifier. If so, step 622 converts the packet to eliminate the redundancy, e.g., adds the identifier and checksum to the packet header, and any other data (e.g., sets a flag) to indicate that the packet is a copy of an already known packet.

If the packet has not been sent, it is possible that one or more chunks of the packet payload are already known to the system. If so, the packet may be reduced or eliminated via steps 624 and 626 by chunking the packet before sending at step 628. Compression of the packet payload or individual chunks therein may be performed as part of step 626; similarly encryption may be employed. For example, an entire payload may be encrypted, or any individual chunk (e.g., a sensitive one containing a credit card number) or chunks may be encrypted.

Although not shown, it is understood that the packets may be separated into chunks in any suitable way, with the chunks looked up individually (e.g., in a loop that first checks the cache, then the lookup service if a cache miss occurs) to see if each chunk already exists; if found the local cache may be updated. New chunks may be added to the cache/lookup service for future use in data transmission reduction. Similarly, old packets or chunks may be deleted from the cache/lookup service based on cost (e.g., storage and computation overheads) versus benefit (e.g., expected savings in network communication costs) analysis. For instance, chunks may have an insertion time of being added to the cache/lookup service and removed from the cache/lookup service after one month. Note that the cache at the processing agent and the lookup service may keep different timeouts for expiry/deletion of chunks or packets kept for redundancy elimination.

Note that any packet content may be chunked, however step 624 can decide not to do so, e.g., if the payload is too small to be worth chunking, if the destination has requested a retransmission of full clean copy (e.g., because a previously cached chunk was corrupt), and so forth. To support such a function, the sender may keep a local copy of each sent packet at the processing agent before that packet is marked as received by the destination. If the destination asks for a retransmission/full clean copy, then the cached packet can be sent from the local copy. The processing agent at the source may maintain a cache (e.g., the cache 229 of FIG. 2) of transmitted packets yet to be acknowledged by their respective destination.

Step 628 sends the packet, whether as a previously known packet (step 622), in a chunked or partially chunked form (step 626) or as is without redundancy reduction/elimination. This includes any payload compression in whole or in individual chunks.

Figure 7:
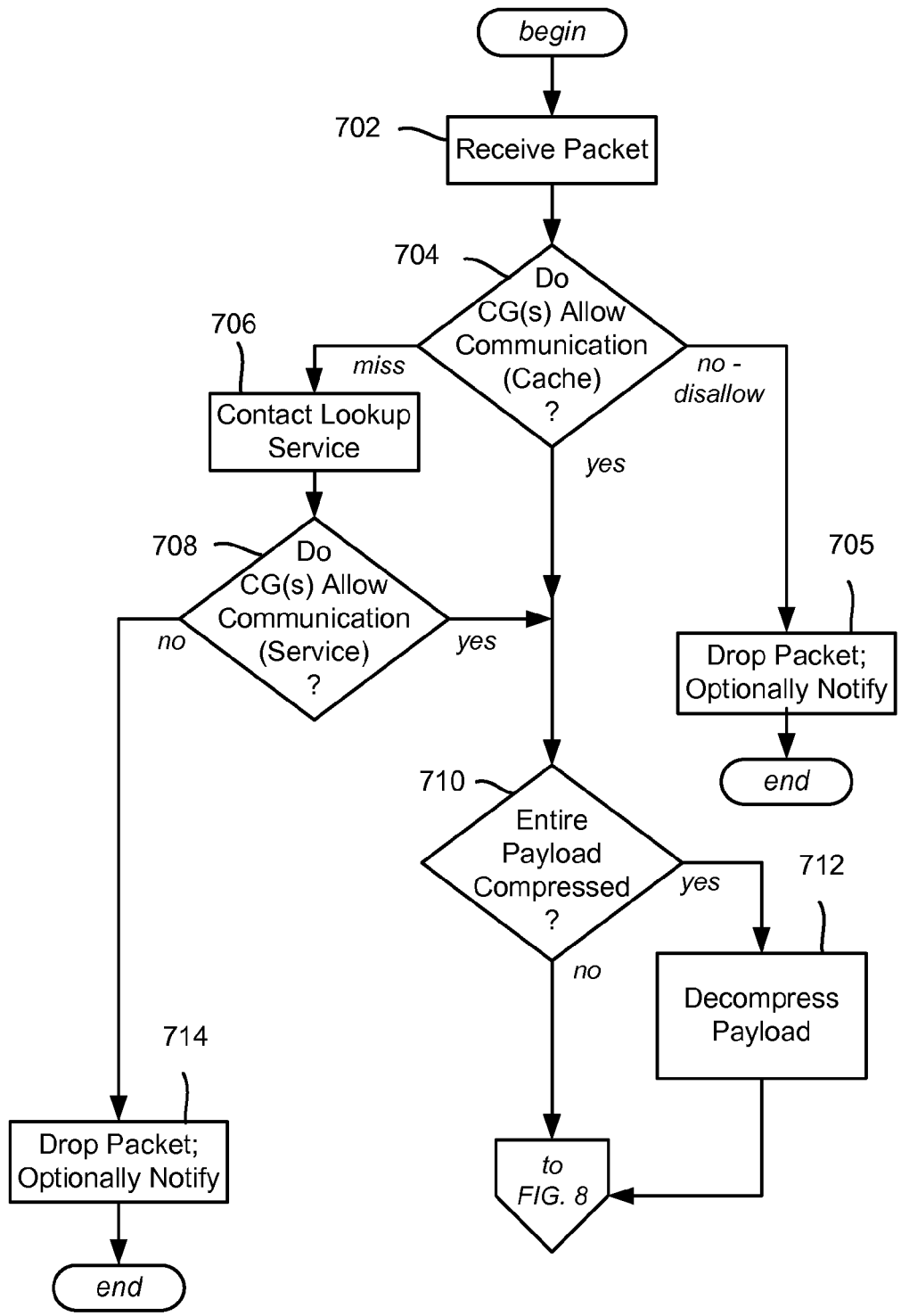
FIGS. 7-9 comprise a flow diagram representing example steps that may be taken to handle received data packets, including enforcing transmission policy and handling data packets configured with redundancy reduction, according to one example implementation.

FIG. 7 shows example steps that may be taken at a destination machine, beginning at step 702 where a packet is received. Step 704 represents the destination checking communication group membership to determine whether the packet is allowed to be forwarded to an application. If explicitly disallowed, step 704 branches to step 705 where the packet is dropped and an optional notification provided. If explicitly allowed, step 704 branches to step 710 as described below. If a cache miss occurred, (whether actual or because stale data is estimated), step 706 is executed to contact the lookup service, followed by step 708 which decides whether the packet is allowed or disallowed. If disallowed, the packet is dropped at step 714. The cache may be synchronized upon a miss.

Figure 8:
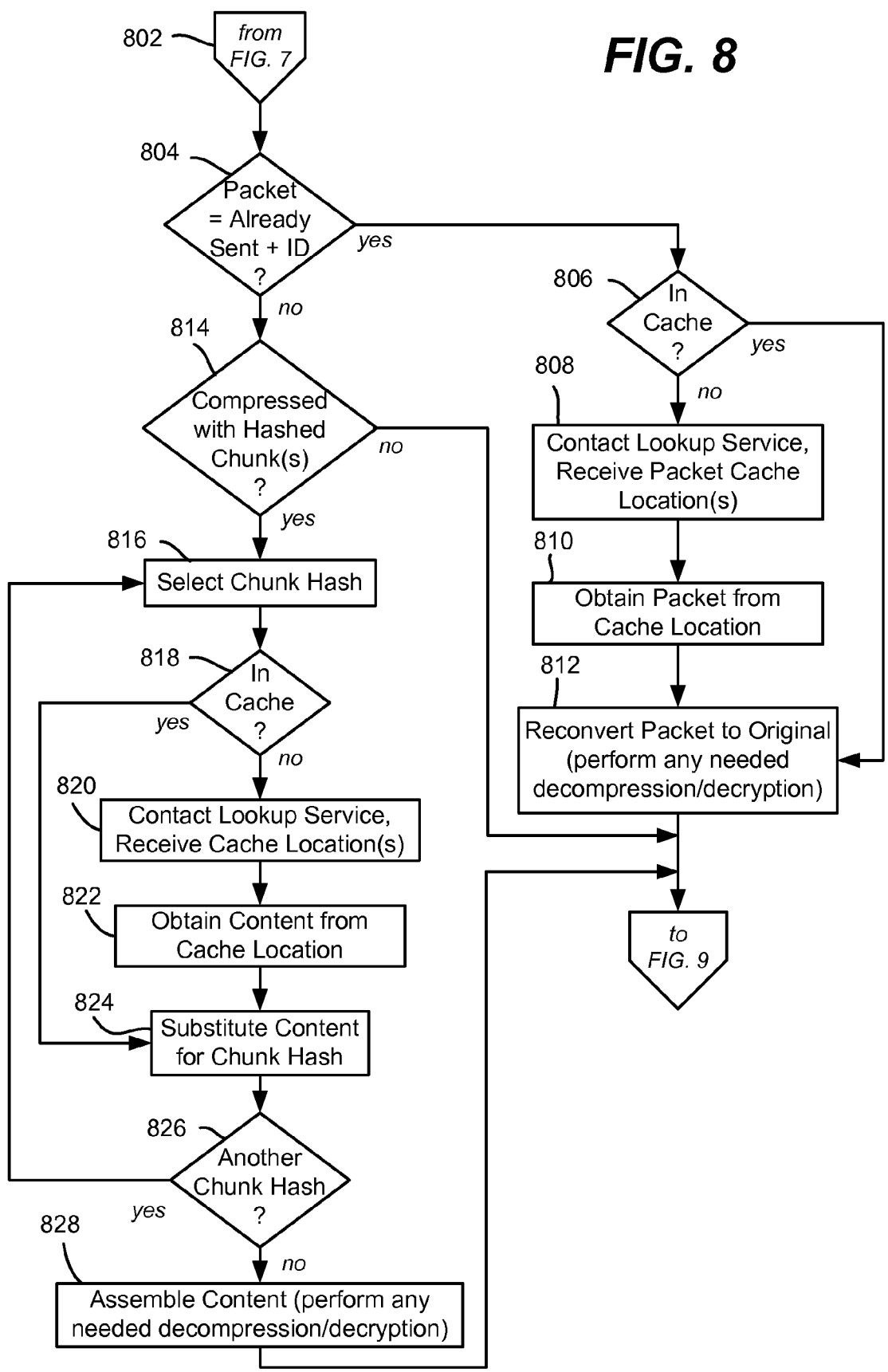

If allowed via the cache or lookup service, step 710 checks the header information to determine if the entire payload is compressed. If so, step 712 decompresses the payload. At this time, the payload is ready for further processing, continuing at step 802 of FIG. 8.

Step 804 checks whether the packet is one that is known to have been already sent. If so, step 806 looks for a copy in a local cache, and if found, uses that copy at step 812 to reconstruct the original packet, e.g., at least its payload. If not locally cached, steps 808 and 810 obtain the packet from another location as provided via the lookup service, for reconstructing at step 812. Reconstructing may include any individual chunk decryption and/or decompression. Note that the service may return multiple locations, with the destination configured to select a likely most efficient location.

If not a previously sent packet, step 814 evaluates whether the packet payload is chunked. If not, the packet is complete as originally provided by the sender, and can be used in a conventional way.

If chunked, the data each of the one or more chunks are selected (step 816) and are located via steps 818 and 824 (if locally cached), or via steps 820, 822 and 824 (if cached elsewhere). Note that the service may return multiple locations for each chunk, with the destination configured to select a likely most efficient retrieval location. Further, note that requests for chunks may be batched; e.g., step 822 may be deferred until all chunk identifiers are processed rather than per-chunk identifier, so that retrieval is more efficient.

Steps 824 and 826 replace each chunk with the corresponding content. Step 828 assembles the data as needed, e.g., rearranges based upon offset into a set of data that matches the original payload before redundancy reduction. Any needed per-chunk decompression and/or decryption is also performed.

Figure 9:
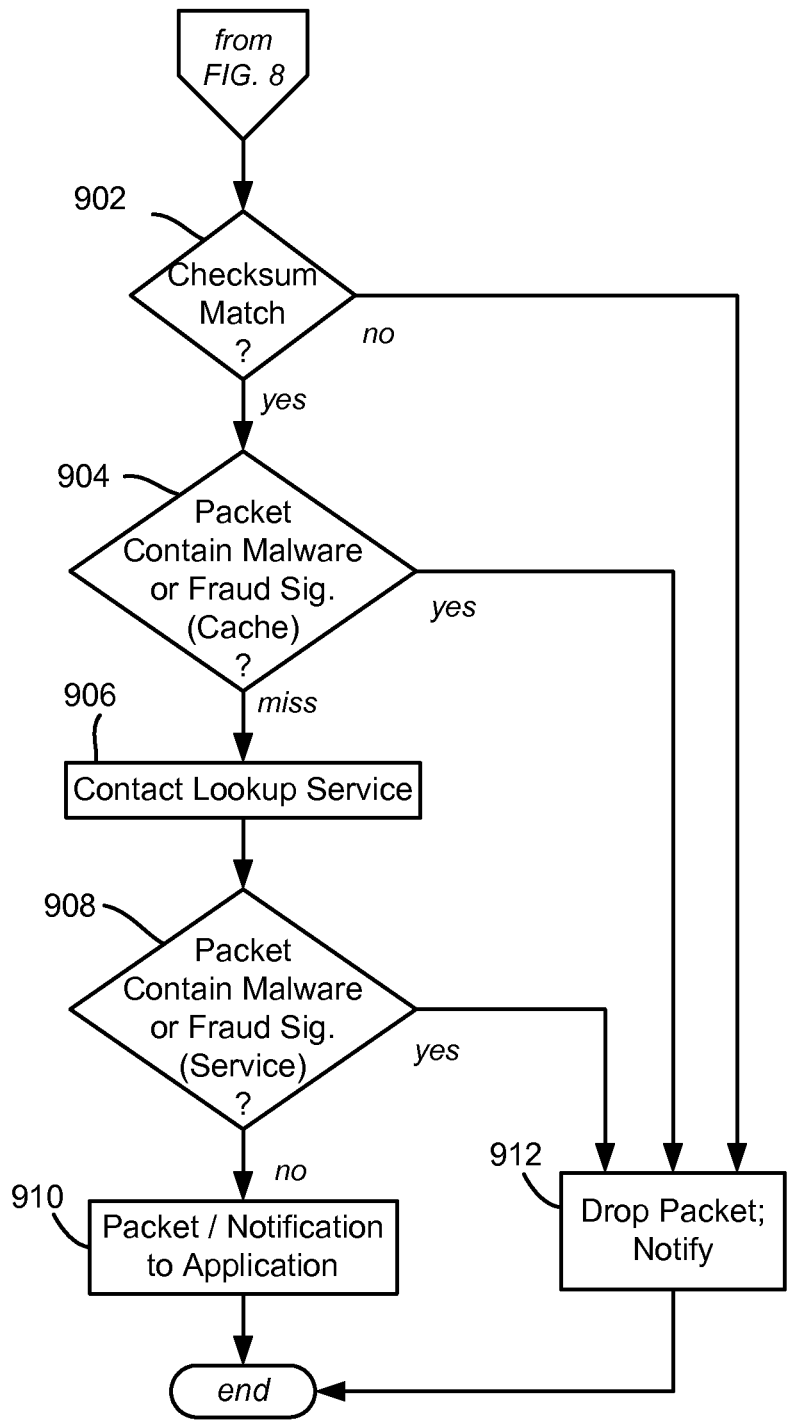

Step 902 of FIG. 9 is next performed, which matches the checksum of the reconverted/reconstructed packet payload against the checksum 446 (FIG. 4) specified in the redundancy elimination protocol header of the packet received. If not matched, the packet is dropped (step 912), and a dropped notification may be output. If the checksum matches at step 902, the packet is checked for malware and fraud signatures using a local cache at step 904, which if matched is dropped (step 912). Otherwise a cache miss occurred.

If a cache miss occurs, step 906 and 908 use the lookup service to check for a malware/fraud signature therein. If a signature is detected, step 912 drops the packet and outputs a notification (and the local cache may be updated), otherwise the packet is delivered (step 910).

As can be seen, there is provided a end-host based technique of eliminating redundancy in intra-datacenter and inter-datacenter network traffic to reduce bandwidth costs. A packet header may be modified to carry an identifier of entire redundant content and its checksum, or packet content may be broken into sets of redundant content (called chunks) and original data, with the former including the byte boundaries (offset and size) of each chunk. Further, potentially malicious traffic may be detected and dropped at the source, before such traffic enters the network. A lookup service maintains communication group membership (e.g., mutually trusting virtual machines and/or services), and a content distribution network service tracks network-wide redundant content and list of malware signatures.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage. It is understood that the system setup may be native mode operation (e.g., directly on hardware) or a virtualized environment, or a combination of both.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 10:
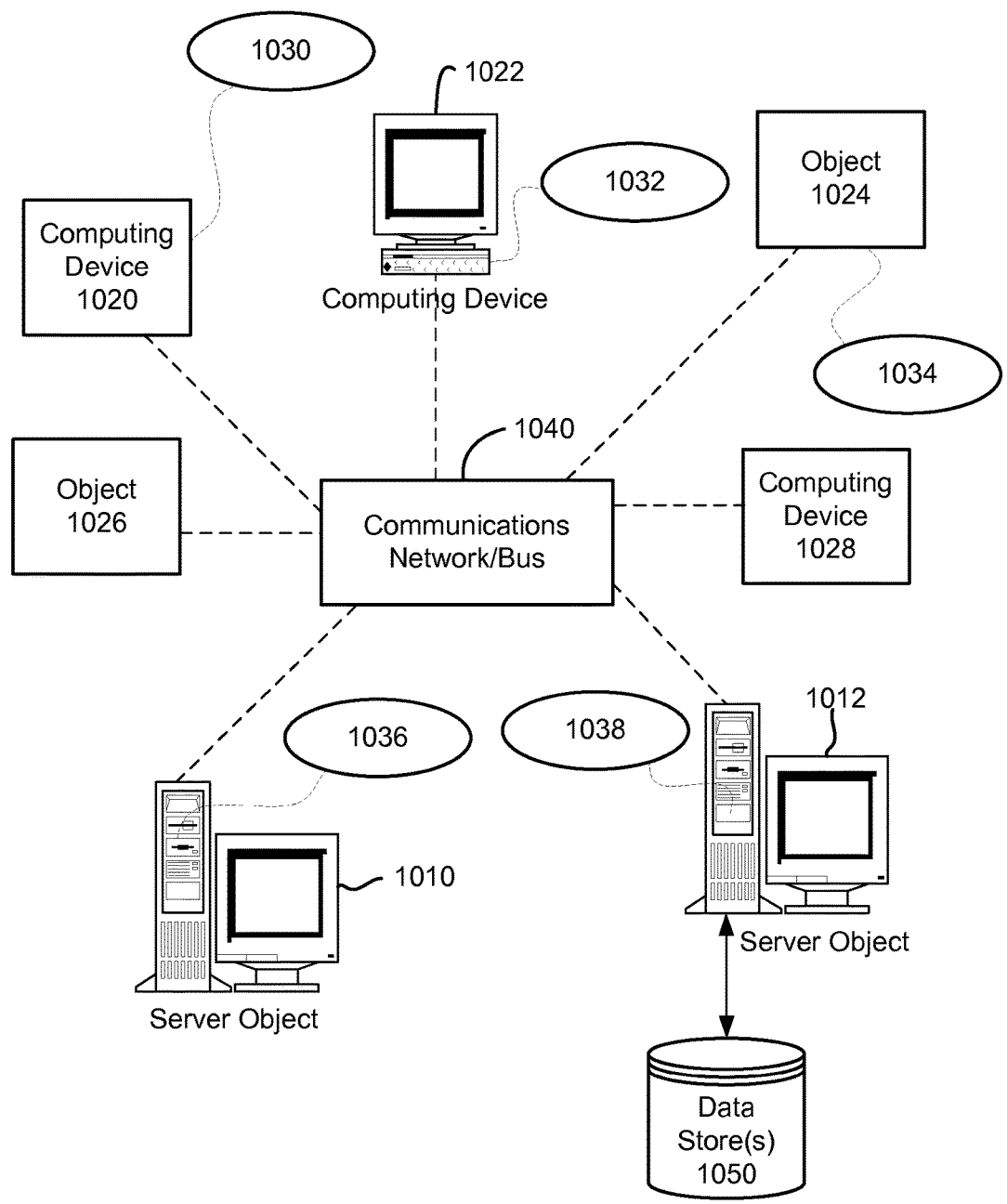
FIG. 10 is a block diagram representing example non-limiting networked environments in which various embodiments described herein can be implemented.

FIG. 10 provides a schematic diagram of an example networked or distributed computing environment. The distributed computing environment comprises computing objects 1010, 1012, etc., and computing objects or devices 1020, 1022, 1024, 1026, 1028, etc., which may include programs, methods, data stores, programmable logic, etc. as represented by example applications 1030, 1032, 1034, 1036, 1038. It can be appreciated that computing objects 1010, 1012, etc. and computing objects or devices 1020, 1022, 1024, 1026, 1028, etc. may comprise different devices, such as personal digital assistants (PDAs), audio/video devices, mobile phones, MP3 players, personal computers, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, communications network 1040 may comprise other computing objects and computing devices that provide services to the system of FIG. 10, and/or may represent multiple interconnected networks, which are not shown. Each computing object 1010, 1012, etc. or computing object or device 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1040 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 11 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
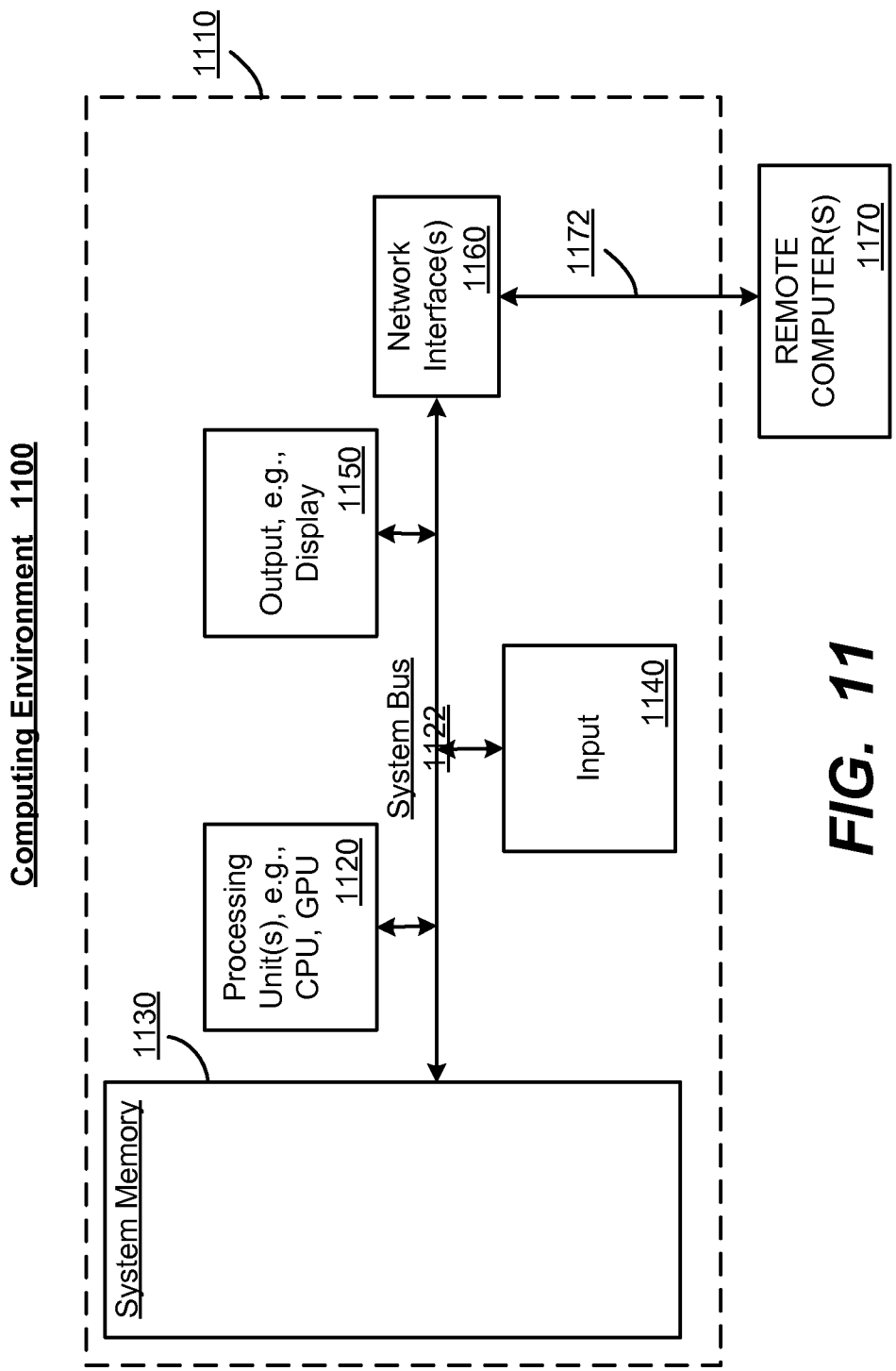
FIG. 11 is a block diagram representing an example non-limiting computing system or operating environment in which one or more aspects of various embodiments described herein can be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, system memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for processing a packet from a source intended for a destination machine, the method comprising:
   sending a first packet over a network to the destination machine;
   receiving a request to send a second packet to the destination machine, contents of the second packet comprising a first portion and a second portion;
   determining that a communication group allows contents of the second packet to be communicated to the destination machine;
   prior to sending the second packet over a network to the destination machine:
   determining whether the first portion and the second portion of the contents of the second packet match contents of the first packet that have already been received by the destination machine;
   determining that the second packet does not contain a malware signature or fraud signature; and
   upon determining that the second packet does not contain the malware signature or fraud signature, determining that the first portion of the contents of the second packet match the contents of the first packet that have already been received by the destination machine, altering the second packet by removing the first portion of the contents of the second packet while maintaining the second portion of the contents of the second packet and providing an indication that the first portion of the contents of the second packet is a copy of the contents of the first packet by adding an identifier and checksum to a header of the second packet; and
   sending, over the network, the altered second packet to the destination machine; and
   upon determining that the second packet has not already been received by the destination machine, identifying one or more chunks of the second packet that include redundant data; and
   replacing the one or more chunks with a chunk identifier corresponding to a data chunk having content that is retrievable via the chunk identifier.

2. The method of claim 1, further comprising:
   intercepting, by a processing agent, the second packet from the source;
   comparing contents of the second packet with data in a cache; and
   upon determining that the data in the cache does not correspond with the contents of the second packet, accessing a lookup service that determines the source is allowed to communicate with the destination machine.

3. The method of claim 1, further comprising: receiving the second packet at a destination processing agent.

4. The method of claim 1, further comprising:
   determining whether packets from the source are allowed to be sent to the destination or received by the destination.

5. The method of claim 1, further comprising:
   receiving the altered second packet at the destination machine; and
   using the identifier to retrieve contents of the altered second packet from a local cache.

6. The method of claim 1, further comprising:
   determining whether to allow the second packet to be communicated over the network to the destination machine based upon one or more of the following: a type of the second packet, and a communication protocol over which the second packet is being sent.

7. The method of claim 1, further comprising:
   determining whether to allow the second packet to be communicated over the network to the destination machine based upon a type of the second packet and a communication protocol over which the second packet is being sent.

8. The method of claim 1, further comprising:
   receiving the chunk identifier at the destination machine; and using the chunk identifier to retrieve corresponding chunk data from a cache.

9. The method of claim 1, further comprising:
   receiving the chunk identifier at the destination machine;
   using the chunk identifier to retrieve corresponding chunk data; and
   assembling the contents of the second packet from one or more of the following: the corresponding chunk data and other chunk data, from the corresponding chunk data and other content, and from the corresponding chunk data, other chunk data, and other content including decompressing any compressed data.

10. The method of claim 1, further comprising:
receiving the chunk identifier at the destination machine;
using the chunk identifier to retrieve corresponding chunk data; and
assembling the contents of the second packet from one or more of the following: the corresponding chunk data and other chunk data, from the corresponding chunk data and other content, and from the corresponding chunk data, other chunk data, and other content including decrypting any encrypted data.

11. The method of claim 1, wherein determining that the source is in a communication group with the destination machine comprises determining, via policy data, which virtual machines, virtual machine applications, or storage/compute nodes of an application/service or nodes across different applications/services are allowed to communicate with one another.

12. The method of claim 1, further comprising:
upon determining that the communication group allows contents of the second packet to be communicated to the destination machine, searching the second packet for a malware signature or a fraud signature by comparing the contents of the packet with malware signatures and fraud signatures stored in a cache-coupled to the processing agent;
determining that a presence of a malware signature or a fraud signature cannot be identified; and
upon determining that a presence of a malware signature or a fraud signature cannot be identified, buffering the packet and subsequent packets sent from the source application until a presence of a malware signature or a fraud signature is identified from the subsequent packets or until the packet and the subsequent packets sent from the source are determined not to be fraudulent.

13. A system comprising:
a network;
a source application;
a destination application; and
a processing agent, the processing agent configured to:
enforce policy on data to be sent from the source application over the network to the destination application;
receive a request to send a second packet to the destination application, contents of the second packet comprising a first portion and a second portion;
determine that a communication group allows contents of the second packet to be communicated to the destination application;
identify a first packet that was previously sent over the network to the destination application;
prior to sending the second packet to the destination application:
determine whether the first portion of the contents of the second packet match the content of the first packet that have already been received by the destination application;
determine that the second packet does not contain a malware signature or fraud signature; and
upon determining that the second packet does not contain the malware signature or fraud signature, determining that the first portion of the contents in the second packet match the contents of the first packet that have already been received by the destination application, reduce redundant traffic by removing first portion of the content in the second packet while maintaining the second portion of the contents of the second packet and providing an indication that the first portion of the contents of the second packet is a copy of the contents of the first packet by adding an identifier and checksum to a header of the second packet that is representative of the content in the second packet instead of sending first portion of the content in the second packet; and
upon determining that the second packet has not already been received by the destination application, identifying one or more chunks of the second packet that include redundant data; and
replacing the one or more chunks with a chunk identifier corresponding to a data chunk having content that is retrievable via the chunk identifier.

14. The system of claim 13, wherein the processing agent is further configured to:
communicate with a cache to obtain information that identifies whether packets from the source application are allowed to be sent to the destination application or received by the destination application, wherein the information that identifies whether packets received from the source application are allowed to be sent to the destination application or received by the destination application comprises one or more of the following: information that identifies whether the destination application is in at least one communication group to which the source application is allowed to send packets or is disallowed from sending packets, and information that identifies whether the source application is in at least one communication group from which the destination application is allowed to receive packets or is disallowed from receiving packets.

15. The system of claim 14, wherein the information that identifies whether packets from the source application are allowed to be sent to the destination application or received by the destination application comprises information that identifies whether the packets are associated with a malware signature or fraud signature.

16. The system of claim 13, further comprising:
a data store coupled to the processing agent, the data store containing packets that have been transmitted but not yet acknowledged for use in retransmission of packets from the source.

17. The system of claim 13, wherein the processing agent is configured to:
reduce redundant traffic at the source application by replacing at least part of a packet with an identifier or a set of identifiers that represent content accessible to the destination application from a cache/lookup service via the identifier or set of identifiers.

18. One or more computer storage devices having computer-executable instructions that cause one or more processors to perform operations comprising:
sending a first packet over a network to a destination machine;
intercepting a second packet that is intended for the destination machine, contents of the second packet comprising a first portion and a second portion;
determining that a communication group allows contents of the second packet to be communicated to the destination machine;
prior to sending the second packet to the destination machine:

determining whether the first portion of the contents of the second packet matches contents of the first packet that have already been received by the destination machine;

determining that the second packet does not contain a malware signature or fraud signature; and upon determining that the second packet does not contain the malware signature or the fraud signature, determining that the first portion of the contents of the second packet matches the contents of the first packet that have already been received by the destination machine, altering the second packet by removing the first portion of the contents of the second packet while maintaining the second portion of the contents of the second packet and adding an indication that the first portion of the contents of the second packet is a copy of the contents of the first packet by adding an identifier and checksum to a header of the second packet; and sending the altered second packet to the destination machine; and upon determining that the second packet has not already been received by the destination machine, identifying one or more chunks of the second packet that include redundant data; and replacing the one or more chunks with a chunk identifier corresponding to a data chunk having content that is retrievable via the chunk identifier.

19. The one or more computer storage devices of claim 18, wherein the reduced-size data transmission comprises a packet, and wherein replacing the first portion of the contents of the second packet with the identifier comprises sending a packet identifier corresponding to the first packet that includes the contents.

20. The one or more computer storage devices of claim 18, wherein replacing the first portion of the contents of the second packet with the identifier comprises replacing at least part of the first portion of the contents of the second packet with a hash value representative of a data chunk corresponding to the at least part of the first portion of the contents of the second packet.

21. A processing agent configured to:

enforce policy on data to be sent from a source application over a network to a destination application;

receive a request to send a second packet to the destination application, contents of the second packet comprising a first portion and a second portion;

determine that a communication group allows contents of the second packet to be communicated to the destination application;

identify a first packet that was previously sent over the network to the destination application;

prior to sending the second packet to the destination application:

determine whether the first portion of the contents in the second packet match the content of the first packet that has already been received by the destination application;

determine that the second packet does not contain a malware signature or fraud signature; and upon determining that the second packet does not contain the malware signature or fraud signature, upon determining that first portion of the contents in the second packet match the contents of the first packet that has already been received by the destination application, reduce redundant traffic by removing the first portion of the contents in the second packet while maintaining the second portion of the contents of the second packet and using an identifier representative of the first portion of the contents in the second packet instead of sending the first portion of the contents in the second packet; and upon determining that the second packet has not already been received by the destination application, identifying one or more chunks of the second packet that include redundant data; and replacing the one or more chunks with a chunk identifier corresponding to a data chunk having content that is retrievable via the chunk identifier.

22. The processing agent of claim 21, wherein the processing agent is further configured to:

communicate with a cache to obtain information that identifies whether packets from the source application are allowed to be sent to the destination application or received by the destination application, wherein the information that identifies whether packets received from the source application are allowed to be sent to the destination application or received by the destination application comprises one or more of the following: information that identifies whether the destination application is in at least one communication group to which the source application is allowed to send packets or is disallowed from sending packets, and information that identifies whether the source application is in at least one communication group from which the destination application is allowed to receive packets or is disallowed from receiving packets.

23. The processing agent of claim 22, wherein the information that identifies whether packets from the source application are allowed to be sent to the destination application or received by the destination application comprises information that identifies whether the packets are associated with a malware signature or fraud signature.

24. The processing agent of claim 21, wherein the processing agent is communicatively coupled to a data store, the data store containing packets that have been transmitted but not yet acknowledged for use in retransmission of packets from the source.

25. The processing agent of claim 21, wherein the processing agent is further configured to:

reduce redundant traffic at the source application by replacing at least part of a packet with an identifier or a set of identifiers that represent content accessible to the destination application from a cache/lookup service via the identifier or set of identifiers.

* * * * *